United States Patent [19]

Chamberlain, IV

[11] Patent Number: 5,565,947
[45] Date of Patent: Oct. 15, 1996

[54] FRAMING APPARATUS FOR A CAMERA

[75] Inventor: Frederick R. Chamberlain, IV, Vista, Calif.

[73] Assignee: Eastman Kodak Company, Rochester, N.Y.

[21] Appl. No.: 574,525

[22] Filed: Dec. 19, 1995

[51] Int. Cl.$^6$ ............................ G03B 13/02; G03B 13/20
[52] U.S. Cl. ................................. 396/376; 396/89
[58] Field of Search ...................... 354/220, 163

[56] References Cited

U.S. PATENT DOCUMENTS

| | | | |
|---|---|---|---|
| 2,143,926 | 8/1935 | Simjian | 354/220 |
| 3,619,202 | 6/1970 | Bellows | 354/220 |
| 3,836,985 | 9/1974 | Lange | 354/287 |
| 4,560,261 | 12/1985 | Ueda et al. | 354/121 |
| 4,771,300 | 9/1988 | Bryan | 354/81 |

*Primary Examiner*—Michael L. Gellner
*Assistant Examiner*—John Chizmar
*Attorney, Agent, or Firm*—David M. Woods

[57] ABSTRACT

A camera includes an enclosure having a front surface for supporting an optical section relative to an optical axis intersecting an image receiver supported relative to a back surface, and a lens positioned in the optical axis on the front surface of the camera and projecting a field of view forwardly of the camera. A plurality of thin elements are arrayed on the front surface of the camera around the lens in general correspondence with the field of view. Framing accuracy is improved for self portraits and the like by canting each element outwardly from the optical axis at such an angle that an inside surface of every element is visible to a subject positioned within the field of view of the lens.

26 Claims, 5 Drawing Sheets

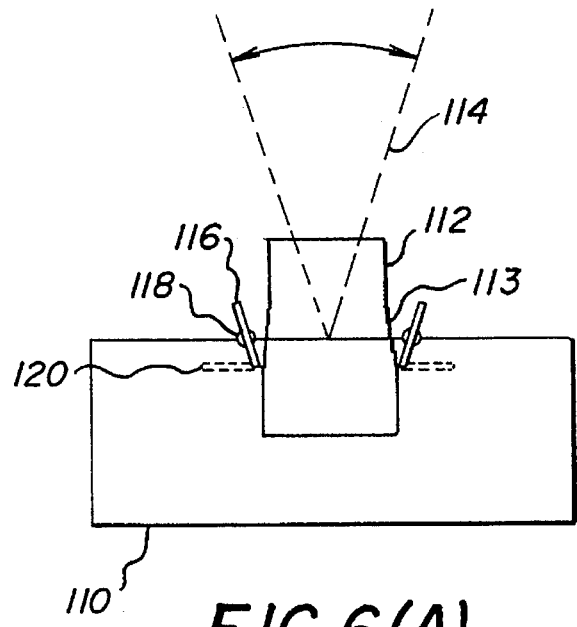
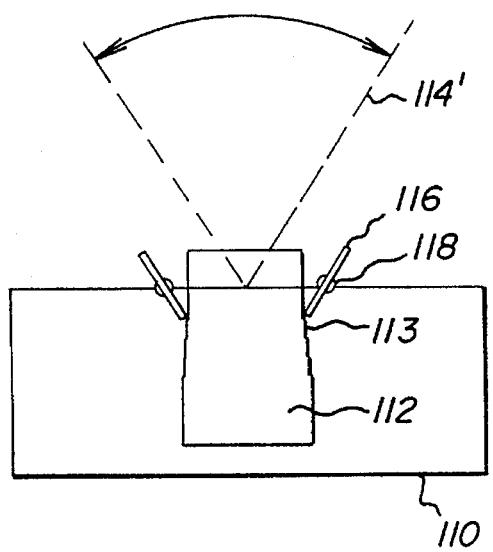
FIG. 6(A)    FIG. 6(B)
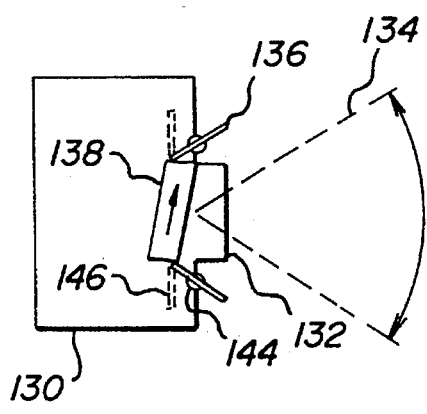
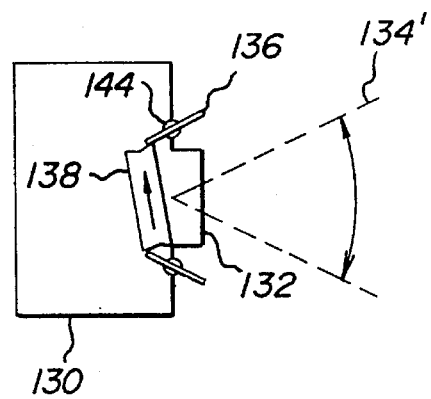
FIG. 7(A)    FIG. 7(B)
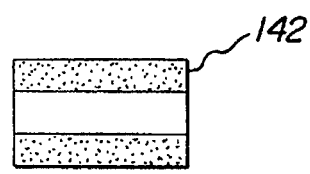
FIG. 8(A)    FIG. 8(B)

FRAMING APPARATUS FOR A CAMERA

FIELD OF THE INVENTION

This invention relates to a camera provided with a framing device on the front of the camera housing.

BACKGROUND OF THE INVENTION

When taking a picture with a self-timer or other remote control device, it is generally difficult to accurately know one's own position within the coverage of the lens or one's own position relative to other objects within the field of view of the scene being photographed.

U.S. Pat. No. 4,560,261 describes a camera having a framing mirror adjacent one side of the taking lens window. The user is then able to observe the picture coverage from a location in front of the camera and accordingly frame the scene to be photographed. This patent also describes a coverage recognition sign, such as a light emitting diode, mounted in an aperture in the framing mirror so that a person in a predetermined position, e.g., the center of the lens coverage, can observe the sign. These aids together assist a user in getting into the picture.

The basic problem with a framing mirror is its limited range. In the aforementioned patent, the self timing portrait taking distance is described to be about 1 meter. Trying to see the small mirror image even at this distance is difficult, and at a larger distance is clearly impractical. Although the light emitting diode in the framing mirror could presumably be seen at a greater distance, it defines only a single point in the frame. The diode is not useful for other positions in the frame, nor does it warn the subject when one is out of the frame.

SUMMARY OF THE INVENTION

The present invention is directed to overcoming one or more of the problems set forth above. Briefly summarized, according to one aspect of the present invention, the framing apparatus is incorporated into a camera that includes an enclosure having a front surface for supporting an optical section relative to an optical axis intersecting an image receiver, and a lens positioned in the optical axis on the front surface of the camera and projecting a field of view forwardly of the camera. A plurality of thin elements are arrayed on the front surface of the camera around the lens in general correspondence with the field of view. Framing accuracy is improved for self portraits and the like by canting each element outwardly from the optical axis at such an angle that an inside surface of every element is visible to a subject positioned within the field of view of the lens. By further coloring the inside surface of every element with a bright color, the subject can quickly determine correct positioning within the field of view.

The advantage of the invention is that it is a simple, yet accurate, non-powered technique for a subject to determine self-position within an image frame.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 6A and 6B are two views of a further embodiment of the framing apparatus specifically for a camera with a zoom lens;

FIGS. 7A and 7B are two views of a further embodiment of the framing apparatus specifically for a camera capable of providing different formats;

FIGS. 8A and 8B illustrate two different formats provided by the framing apparatus shown in FIGS. 7A and 7B;

DETAILED DESCRIPTION OF THE INVENTION

Figure 1:
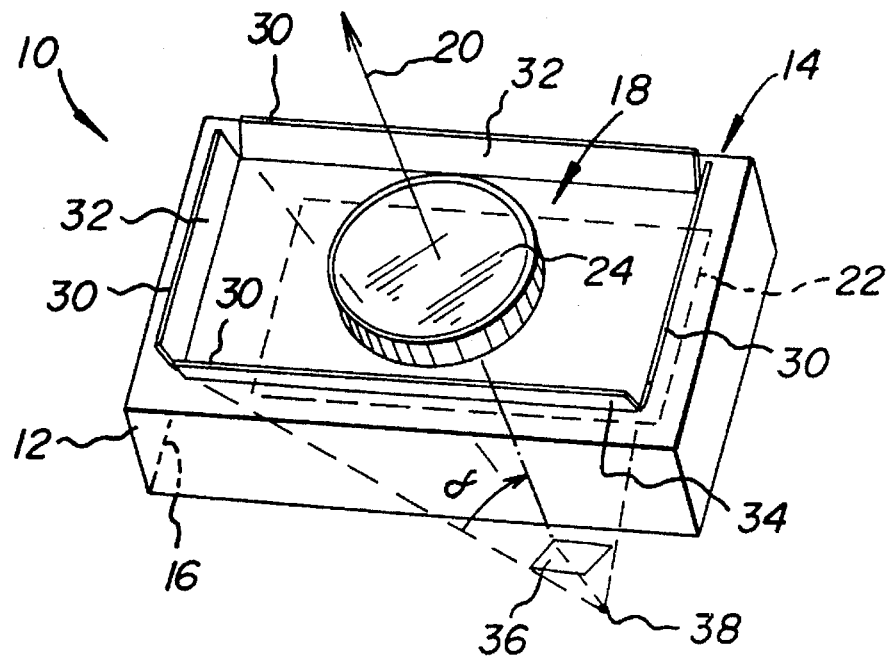
FIG. 1 is a basic diagram of a framing apparatus according to the invention as mounted around a lens.
Figure 2:
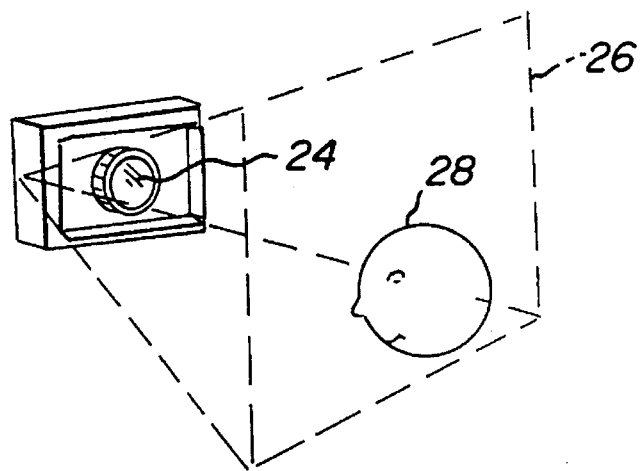
FIG. 2 is a diagram showing the field of view of the framing apparatus shown in FIG. 1 in relation to a subject.

In situations where the camera user is the subject (or part of the subject), image framing accuracy can be improved by using the framing apparatus shown in FIG. 1. The framing apparatus is embodied in a camera 10 including an enclosure 12 having a front surface 14 and a rear surface 16. The front surface 14 supports an optical section 18 relative to an optical axis 20. The optical section 18 includes a lens 24 positioned in the optical axis 20 to project an image of the subject upon an image receiver 22 positioned near the rear surface 16. The lens 24 also projects a field of view 26 forwardly of the camera 10, as shown in FIG. 2. In operation, a subject 28 positions itself within the field of view 26, and its picture is recorded on the image receiver 22.

As shown in FIG. 1, a plurality of thin elements 30 are arranged on the front surface 14 around the lens 24 in general correspondence with the field of view 26. Each element 30 has an inside surface 32 and an outside surface 34. Referring to FIGS. 1 and 2, each thin element 30 is canted outwardly from the optical axis 20 at an angle α such that the inside surface 32 of every element 30 is visible to the subject 28 positioned within the field of view 26 of the lens 24. In this position, the subject 28 preferably sees all of the inside surfaces 32 of the plurality of elements 30 and none of the outside surfaces 34. This technique allows one or more subjects to visually determine if they (or at least their eyes) are in the image frame (i.e., in the field of view 26).

The framing efficiency is further improved by brightly coloring the inside surfaces 32 of the elements 30. If the subject 28 sets up the camera timer (not shown), dashes into position, and sees the bright color from all of the inside surfaces 32, then the subject (or at least a part thereof) is assuredly within the frame. This framing technique can be further improved if the outside surfaces 34 are colored with a different bright color than the inside surfaces 32. Then, if the bright color of the outside surfaces 34 are seen of any one surface 34, then at least a part of the subject is outside of the field of view 26.

In one embodiment, the elements 30 are four planar sheets (hereinafter referred to as planar sheets 30) forming the planar surfaces of a segment of a pyramidal solid angle 36 that defines the area captured by the camera 10 upon the image receiver 22. This solid angle 36 has an (imaginary) apex 38 that is co-located with the center line of the lens 24 to the rear of the camera, that is, on the optical axis 20. By positioning the planar sheets 30 in this manner, they become generally coextensive with the format of the image receiver 22 and thereby define, at least approximately, the edges of the image frame captured by the camera.

It should be emphasized, however, that the benefit of the invention is obtained if the sheets 30 are merely generally aligned with the field of view 26 of the lens 24 and therefore only generally indicate the image frame. For best results, however, the positional accuracy of the surfaces of the sheets 30 defining the field of view could be improved as they approach the surface of the lens 24. Indeed, it may prove desirable in some cases to draw the sheets 30 somewhat inward of the field of view 26 to provide a "safety margin" for framing. On the other hand, however, it may not be desirable in other cases to have these surfaces completely coplanar with actual field of view (perfect accuracy), because such positioning could introduce glare, depending on the lighting conditions. The appended claims are intended to cover all of these alternative positions for the surfaces.

Figure 5:
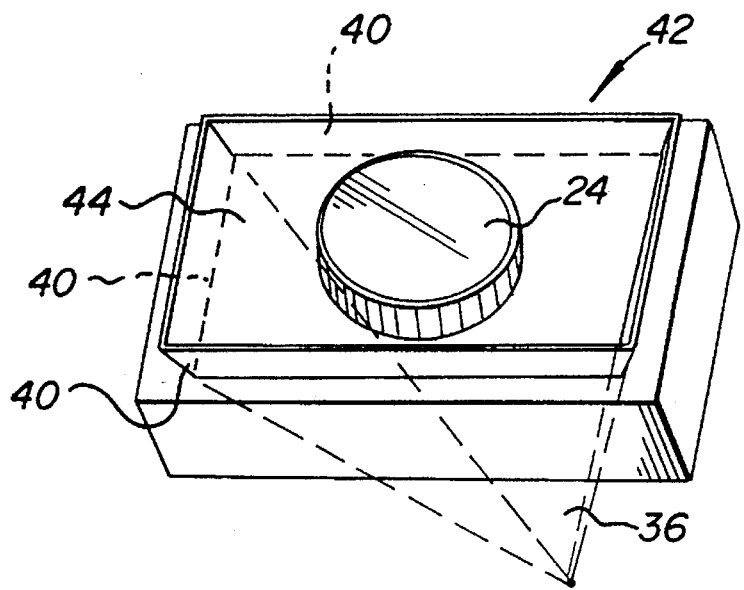
FIG. 5 shows a variation of the framing apparatus shown in FIG. 1.

An alternative embodiment is shown in FIG. 5 in which the planar sheets 30 are the four sides 40 (three visible in FIG. 5) of a solid pyramidal segment 42 of the pyramidal solid angle 36. In this case, the solid segment 42 is a part of the camera that is outset from the front surface 14 to form a ledge 44 on which the lens 24 is mounted. The four sides 40 of the pyramidal segment 42 form four planes that are brightly colored against a dark background of the front surface 14 and the ledge 44. In this embodiment, if subject 28 sets up the camera timer (not shown), dashes into position, and sees none of the bright colored sides 40, then the subject is assuredly within the frame. If the bright color of any side 40 is seen, then the subject quickly repositions before the picture is taken until the bright colors are no longer seen.

Figure 3:
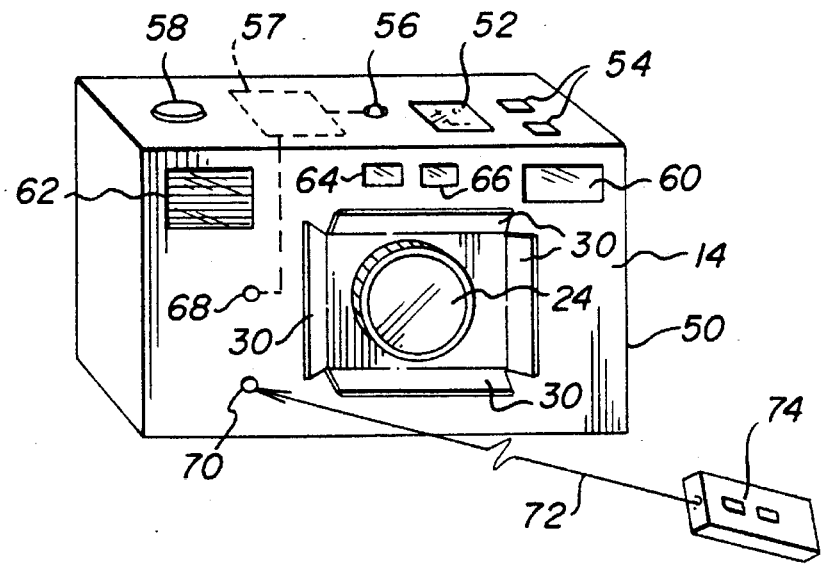
FIG. 3 is a diagram of a photographic camera employing the framing apparatus shown in FIG. 1.

A typical camera application for the first embodiment is shown in FIG. 3. A film camera 50 (in which the image receiver 22 is film) includes four planar framing sheets 30 arrayed around the lens 24 on the front surface 14. Exposure and flash conditions displayed on a liquid crystal display 52 are selected by actuation of camera controls 54. A self timer button 56 and a shutter button 58 are also arrayed on the top of the camera. The self timer button 56 is connected to a timer circuit 57 (shown in phantom lines) in the camera 50 that delays the exposure for a predetermined time so that the camera user can get into the picture. The front surface 14 also includes a viewfinder window 60, a flash unit 62, an autofocus window 64, and an autoexposure window 66. A self timer light emitting diode 68 connected to the timer circuit 57 is positioned on the front surface 14 to blink a count down warning signal to the subject after the self timer button 56 is actuated. An infrared receptor 70 is also positioned on the front surface 14 to receive infrared radiation signals 72 from a remote unit 74, which can be used to initiate a remotely controlled exposure (instead of using the self timer).

Figure 4:
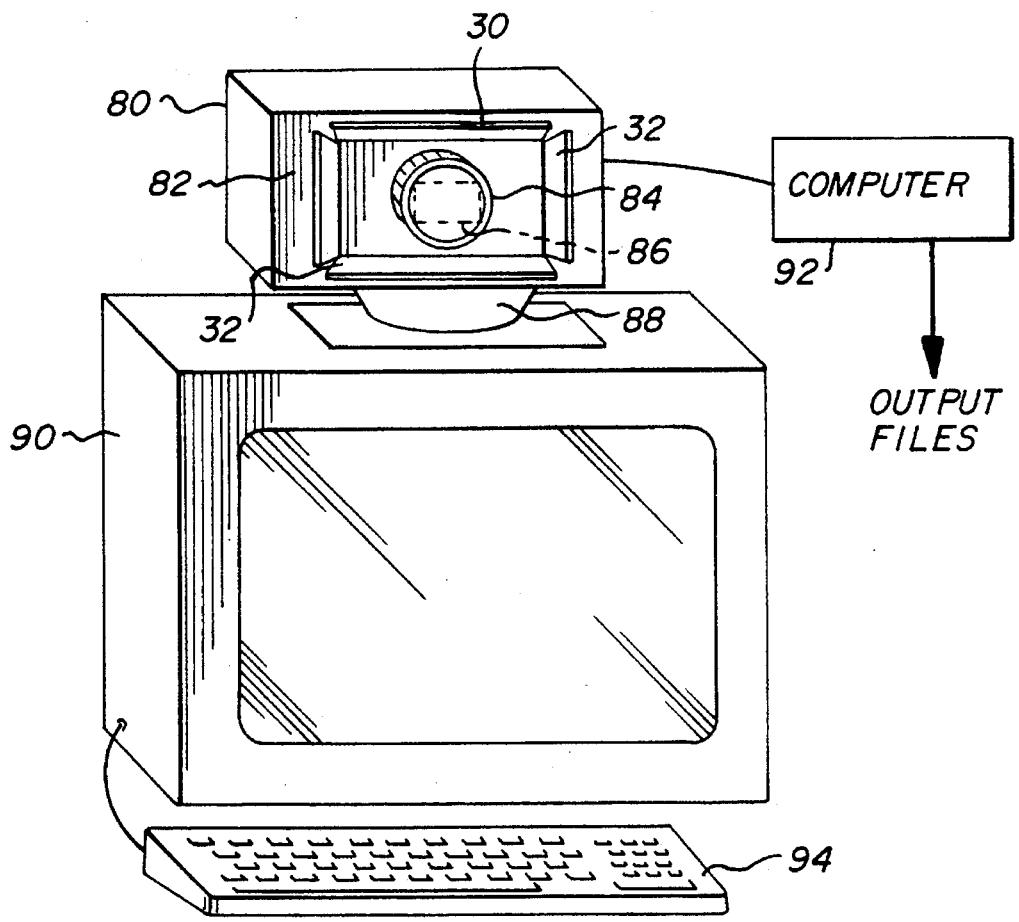
FIG. 4 is a diagram of an electronic imaging module employing the framing apparatus shown in FIG. 1.

FIG. 4 illustrates an electronic imaging application of the framing apparatus of the invention. In the diagram, an electronic imaging module 80 has a front surface 82 for supporting a lens 84 and directing a subject image upon an electronic image receiver 86, such as a charge coupled device. The module 80 is mounted upon a swivel stand 88 that is attached to a monitor 90. The planar sheets 30 are arrayed around the lens 84, as similarly shown in FIG. 1, to provide an indication of framing accuracy. The captured image is transferred to a computer 92, which processes the image and incorporates it into the usual files output by the computer 92. In this type of application, the subject would be sitting in front of a keyboard 94, and would want to be included in the data transferred to and from the computer 92, say for telecommunications purposes (videoconferencing). The subject accordingly adjusts the image module 80, or repositions in front of the module 80, until all of the inside surfaces 32 are clearly in view, and the image of the subject is properly captured.

FIGS. 6A and 6B show the framing apparatus according to the invention implemented on a variable zoom point and shoot camera 110. Two views of camera 110 are shown, one (FIG. 6A) fully zoomed in with a narrow view angle, the other (FIG. 6B) fully zoomed out with a wide view angle. A lens assembly 112 moves in and out to accomplish the variable zoom, which changes a field of view from a narrow field of view 114 to a wide field of view 114'. A surface profile 113 of the lens assembly 112 contacts one edge of each of four framing surfaces 116 (two surfaces shown in FIGS. 6A and 6B), which pivot on four hinges 118 (two shown) and are maintained in contact with lens surface profile 113 by four springs 120 (two shown). The surface profile 113 is designed such that the angle of the framing surfaces 116 are parallel with the field of view at all intermediate values of zoom. Depending on the optics of the camera, the surface profile 113 may be a simple linear ramp or may be a complex curve; either profile may be easily implemented in the lens assembly 112.

FIGS. 7A and 7B show the framing apparatus according to the invention implemented on a fixed lens camera 130, which has the feature of taking pictures in several different image formats on a film frame, in this example a full sized frame 140 as shown in FIG. 8A and a panoramic frame 142 as shown in FIG. 8B. A field of view 134 changes relative to a finished print from a full size field of view 134 to a panoramic field of view 134'. Unlike FIGS. 6A and 6B, where the field of view changes due to the adjustment of the lens 112, in FIGS. 7A and 7B a lens 132 is unchanged, and the desired format is obtained because instructions to the photo finisher indicate that only a portion of the exposed film is to be printed. Framing surfaces 136 can then be adjusted with a manual or automatic mechanism 138, which selects the proper angle for the selected image format pursuant, e.g., to operator selection. As was described in connection with FIGS. 6A and 6B, the framing surfaces are movable on hinges 144 and biased into place by springs 146.

Figure 9:
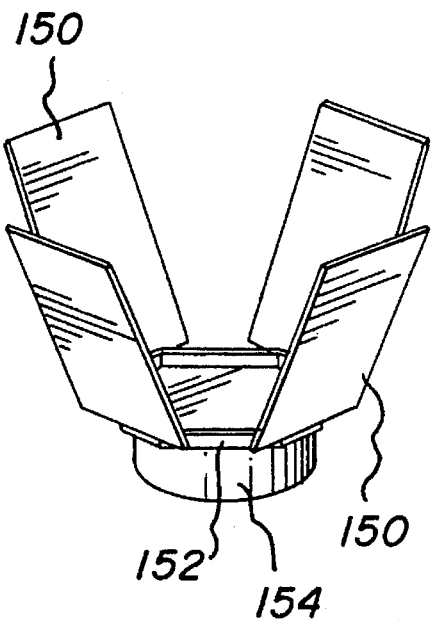
FIGS. 9A and 9B are two views of another version of the framing apparatus for a camera capable of providing different formats.
Figure 9B:
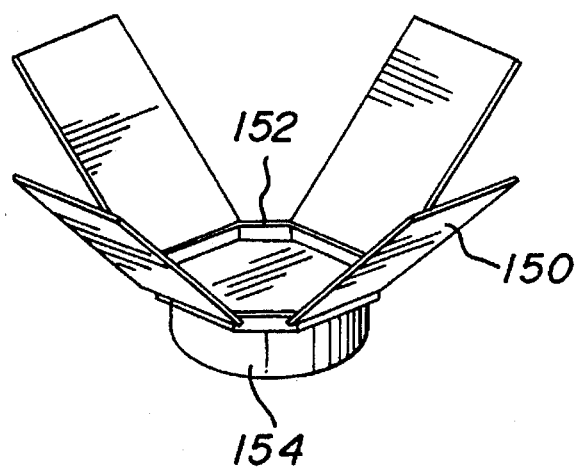

FIGS. 9A and 9B show another way to make a selection of the in-frame angle for the different formats provided by a camera which takes pictures in several different image formats on a film frame. Framing indicators 150 rest against a rotatable ring 152, which could be a continuously curved cam or could have flat stop adjustment points as shown. The ring surrounds a lens 154, which is mounted on a camera (not shown) as described in connection with the preceding Figures. In this example, there are two settings, a zoomed frame (FIG. 9A) and a full frame (FIG. 9B). This rotatable ring method of setting the in-frame indicators could also be incorporated into a single lens reflex zoom lens, where the zoom is adjusted by rotation of an element in the lens.

Figure 10:
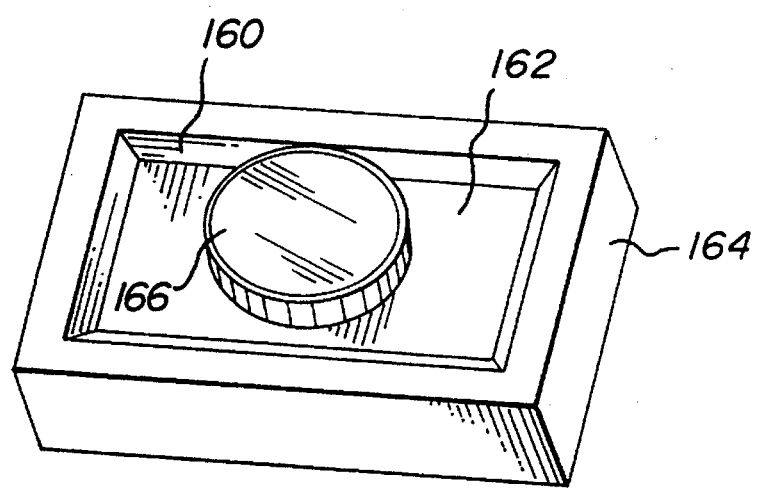
FIG. 10 is a diagram of a camera having the framing surfaces inset in a recessed area on the front of the camera.

The invention has been described with reference to a preferred embodiment. However, it will be appreciated that variations and modifications can be effected by a person of ordinary skill in the art without departing from the scope of the invention. For example, the framing apparatus comprising the planar sheets 30 could be provided as an accessory that is attached to the front surface of a camera by suitable means. Furthermore, as shown in FIG. 10, the four planar sheets 30 could be inset framing surfaces 160 of a recess 162 on the front of a camera 164 in which a lens 164 is located. In this case, the subject would see the four framing surfaces 160 when properly in the field of view; the subject would not see one or more of the surfaces 160 when partially out of the field of view.

PARTS LIST 10 camera
12 enclosure
14 front surface
16 rear surface
18 optical section
20 optical axis
22 image receiver
24 lens
26 field of view
28 subject
30 thin planar sheet
32 inside surface
34 outside surface
36 pyramidal solid angle
38 apex
40 sides
42 pyramidal segment
44 ledge
50 film camera
52 LCD
54 camera controls
56 self timer button
58 shutter button
60 viewfinder window
62 flash unit
64 autofocus window
66 autoexposure window
68 self time LED
70 IR receptor
72 IR signals
74 remote unit
80 electronic imaging module
82 front surface
84 lens
86 electronic image receiver
88 swivel stand
90 monitor
92 computer
94 keyboard
110 variable zoom camera
112 lens assembly
113 surface profile
114 narrow field of view
114' wide field of view
116 framing surface
118 hinges
120 springs
130 fixed lens camera
132 lens
134 full size field of view
134' panoramic field of view
136 framing surfaces
138 manual or automatic mechanism
140 full sized frame
142 panoramic frame
144 hinges
146 springs
150 framing indicators
152 rotatable ring
154 lens
160 inset framing surfaces
162 recess
164 camera
166 lens

I claim:

1. A camera including an enclosure having a front surface for supporting an optical section relative to an optical axis intersecting an image receiver, said camera comprising:

a lens positioned in the optical axis on the front surface of the camera and projecting a field of view forwardly of the camera; and a plurality of thin elements arrayed on the front surface of the camera around the lens in general correspondence with the field of view, each element canted outwardly from the optical axis at such an angle that an inside surface of every element is visible to a subject positioned within the field of view of the lens.

2. A camera as claimed in claim 1 in which the inside surface of every element is brightly colored so as to be easily visible to the subject.

3. A camera as claimed in claim 2 in which each element has an outside surface that is brightly colored differently from each inside surface so that being outside the field of view can be easily distinguished from being inside the field of view.

4. A camera as claimed in claim 1 in which the elements are thin planar segments of a pyramidal solid angle colocated with the optical axis to define the boundaries of the field of view.

5. A camera as claimed in claim 4 in which the area enclosed by the plurality of thin planar segments corresponds to the format of the image receiver.

6. A camera as claimed in claim 1 in which the lens is a zoom lens and the elements are mounted for movement such that their position generally corresponds with the field of view of each zoom position of the lens.

7. A camera as claimed in claim 1 in which the camera is selectively adapted for different formats and the elements are mounted for movement such that their position generally corresponds with the field of view of the selected format.

8. A camera as claimed in claim 1 in which the image receiver is photographic film.

9. A camera as claimed in claim 1 in which the image receiver is an electronic image receiver.

10. A camera as claimed in claim 9 in which the electronic image receiver is a charge coupled device.

11. A camera including an enclosure having a front surface for supporting an optical section relative to an optical axis intersecting an image receiver, said camera comprising:

a lens positioned in the optical axis on the front surface of the camera and projecting a field of view forwardly of the camera; and means projecting from the front surface of the camera and surrounding the lens for providing a visual indication of the field of view of the lens, said projecting means having an inner surface that is wholly visible to a subject positioned within the field of view of the lens.

12. A camera as claimed in claim 11 in which the inner surface is brightly colored so as to be easily visible when the subject is correctly positioned within the field of view of the lens.

13. A camera including an enclosure having a front surface for supporting an optical section relative to an optical axis intersecting an image receiver, said camera comprising:

a segment of a pyramidal solid angle positioned on the front surface of the camera so that the apex of the solid angle colocates with the optical axis rearwardly of the camera;

a lens positioned on the segment in the optical axis and projecting a field of view forwardly of the camera; and wherein the segment has a plurality of planar sides arrayed around the lens in general correspondence with the field of view, the plane of each side canted outwardly from the optical axis at such an angle that the surface of a side is only visible to a subject if the subject is not correctly positioned within the field of view of the lens.

14. A camera as claimed in claim 13 in which the surface of every side is brightly colored so as to be easily visible when the subject is not within the field of view.

15. A camera including an enclosure having a front surface for supporting an optical section relative to an optical axis intersecting an image receiver, said camera comprising:

a lens positioned in the optical axis on the front surface of the camera and projecting a field of view forwardly of the camera; and a plurality of thin planar sheets arrayed on the front surface of the camera around the lens in general correspondence with the field of view, the plane of each surface canted outwardly from the optical axis at such an angle that the inside surface of every sheet is visible to a subject positioned within the field of view of the lens.

16. A camera as claimed in claim 15 in which the inside surface of every sheet is brightly colored so as to be easily visible to the subject.

17. A camera as claimed in claim 16 in which each planar sheet has an outside surface that is brightly colored differently from each inside surface so that being outside the field of view can be easily distinguished from being inside the field of view.

18. A camera as claimed in claim 15 in which the thin planar sheets are segments of a pyramidal solid angle colocated with the optical axis to define the boundaries of the field of view.

19. A camera as claimed in claim 15 in which the area enclosed by the plurality of thin planar sheets corresponds to the format of the image receiver.

20. A camera as claimed in claim 15 in which the lens is a zoom lens and the planar sheets are mounted for movement such that their position generally corresponds with the field of view of each zoom position of the lens.

21. A camera as claimed in claim 15 in which the camera is selectively adapted for different formats and the planar sheets are mounted for movement such that their position generally corresponds with the field of view of the selected format.

22. A framing accessory for use with a camera, said camera including an enclosure having a front surface for supporting a lens relative to an optical axis intersecting an image receiver, said lens positioned in the optical axis on the front surface of the camera and projecting a field of view forwardly of the camera, said accessory comprising:

a plurality of thin elements arrayed on the front surface of the camera around the lens in general correspondence with the field of view, each element canted outwardly from the optical axis at such an angle that an inside surface of every element is visible to a subject positioned within the field of view of the lens.

23. A framing accessory as claimed in claim 22 in which the inside surface of every element is brightly colored so as to be easily visible to the subject.

24. A framing accessory as claimed in claim 23 in which each element has an outside surface that is brightly colored differently from each inside surface so that being outside the field of view can be easily distinguished from being inside the field of view.

25. A framing accessory as claimed in claim 22 in which the elements are thin planar segments of a pyramidal solid angle colocated with the optical axis to define the boundaries of the field of view.

26. A framing accessory as claimed in claim 25 in which the area enclosed by the plurality of thin planar segments corresponds to the format of the image receiver.

* * * * *

UNITED STATES PATENT AND TRADEMARK OFFICE
CERTIFICATE OF CORRECTION

| | | |
|---|---|---|
| PATENT NO. | : 5,565,947 | Page 1 of 1 |
| APPLICATION NO. | : 08/574525 | |
| DATED | : December 19, 1995 | |
| INVENTOR(S) | : Frederick R. Chamberlain, IV | |

It is certified that error appears in the above-identified patent and that said Letters Patent is hereby corrected as shown below:

ON THE TITLE PAGE

Insert the following priority claim on the title page after item (22):

-- Related U.S. Application Data

(60)   Provisional application No. 60/008,072, filed on Oct. 30, 1995. --

Signed and Sealed this
Twentieth Day of May, 2014

Michelle K. Lee
*Deputy Director of the United States Patent and Trademark Office*